Dec. 16, 1952     W. W. WILLIAMS     2,621,548
MOUNTING FOR CUTTING TOOLS
Filed June 2, 1948     2 SHEETS—SHEET 1
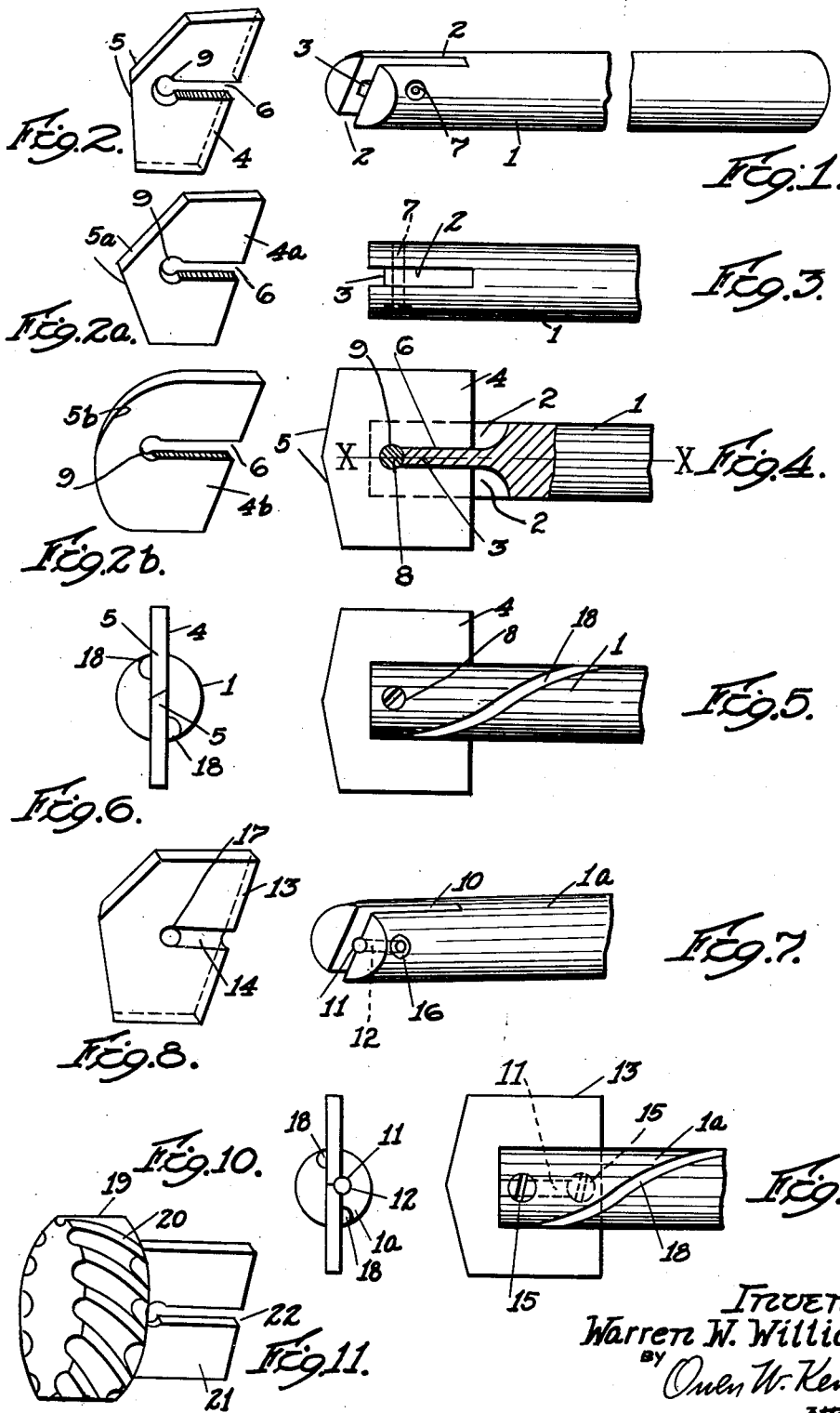
Inventor
Warren W. Williams
BY
Owen W. Kennedy
Attorney Dec. 16, 1952 W. W. WILLIAMS 2,621,548
MOUNTING FOR CUTTING TOOLS
Filed June 2, 1948 2 SHEETS—SHEET 2

Inventor
Warren W. Williams
BY Owen W. Kennedy
ATTORNEY

Patented Dec. 16, 1952

2,621,548

UNITED STATES PATENT OFFICE 2,621,548

MOUNTING FOR CUTTING TOOLS

Warren W. Williams, Royalston, Mass.

Application June 2, 1948, Serial No. 30,542

2 Claims. (Cl. 77—58)

The present invention relates to cutting tools, particularly cutting tools of the rotating type, such as drills, countersinks, counterbores, and the like, which are commonly employed for the performance of various cutting operations.

Generally speaking, cutting tools of this character are made by forming cutting edges on a piece of metal stock of sufficient length to be received in a tool head, or chuck, provided by a suitable power driven element with which the tool is to be used. Tools of such conventional construction are usually marketed in sets, so that a set of drills, for example, will be of substantially identical construction, except for variations in the diameter of the stock from which the drills are made. As a result, sets of cutting tools are relatively expensive and represent a large item in the first cost of equipping even a small machine shop for the performance of various cutting operations by the several types of tools mentioned above.

The object of the present invention is to provide an improved mounting for cutting tools, wherein tools in the form of replaceable inserts are so constructed that any one of a large number of tools may be employed in connection with a common holder shank that is adapted to mount the selected insert tool for use with whatever type of power driven element is available. The various types of insert tools are adapted to be made from flat metal stock, with the tools being initially in the form of identical blanks, prior to the provision of such blanks with various types of cutting edges. As a result, an entire set of insert tools can be mounted on a common holder and used with equal facility for various cutting operations, with a great saving in the amount of metal required for a complete set, as compared to a set of conventional tools for performing the same work.

The above and other advantageous features of the present invention will hereinafter more fully appear from the following description considered in connection with the accompanying drawings, in which—

Fig. 1 is a perspective view of a tool holding shank embodying the present invention.

Fig. 2 is a perspective view of an insert tool for mounting on the shank shown in Fig. 1.

Fig. 3 is a plan view of the shank shown in Fig. 1.

Fig. 4 shows the insert tool of Fig. 2 mounted on the shank of Fig. 1, with the parts in vertical section.

Fig. 5 is a view in side elevation of the insert tool mounted on the holder shank.

Fig. 6 is a view in end elevation of the parts shown in Fig. 5.

Figs. 2a and 2b are perspective views illustrating different forms of insert tools.

Figs. 7 and 8 are perspective views of a modified form of holder shank and insert tool.

Fig. 9 shows the insert tool of Fig. 8 mounted on the shank of Fig. 7.

Fig. 10 is an end view of the parts shown in Fig. 9.

Fig. 11 is a perspective view of a modified form of insert tool for mounting on the shank of Fig. 1.

Figure 13:
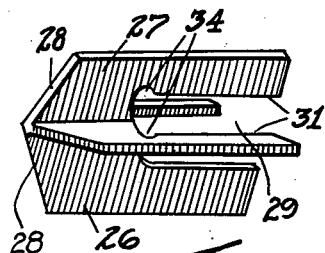
Figs. 12 and 13 are perspective views of a modified form of holder shank and insert tool.

Referring first to Fig. 1, one element of the complete tool mounting consists of a holder shank 1 composed of round bar stock of the desired length and size, so as to readily be received in the chuck or head of a conventional power driven device, such as the shaft extension of an electric motor, or the rotatably driven spindle of a machine tool. The material for the shank 1 is ordinary steel, such as cold rolled steel, or other comparatively soft and inexpensive metal, that can be readily machined, or low grade tool steel, heat treated as required.

One end of the shank 1 is provided with slots 2 separately cut from opposite sides part way through the shank to leave a tongue 3 symmetrically disposed with respect to the longitudinal axis X—X of the shank 1, as shown in Fig. 4. The tongue 3 terminates a short distance away from the end of the shank 1, so that the slots 2 are in communication at the end of the shank, for a purpose which will later appear.

An insert tool 4 is shown in Fig. 2 as being formed from flat bar stock having a thickness substantially the same as the width of the slots 2 in the shank 1, so that the tool 4 will fit tightly in the slots. The bar stock is composed of high speed tool steel, carbon steel, or carbide, and one end of the length that is cut therefrom is provided with cutting edges 5 disposed at an angle to each other, so that the tool 4 will serve as a drill when rotatably driven.

The opposite end of the insert tool 4 is provided with a slot 6 located centrally of the width of the bar stock from which the length is cut, with the slot 6 being of substantially the same width as the thickness of the tongue 3. The depth of the slot 6 is substantially the same as the length of the tongue 3, so that when the tool is mounted on the shank 1, as shown in Fig. 4, the end of the tongue 3 will bottom in the slot 6, with the end portions of the shank 1 closely engaging opposite sides of the tool to provide adequate driving surfaces, as indicated in dotted lines.

It is to be noted that with the tool 4 mounted on the shank 1, as shown in Fig. 4, the location of the tongue 3, in symmetrical relation with respect to the shank axis X—X, insures that the tool 4 will be concentric about this same axis, with the cutting edges 5 evenly disposed with respect to the shank, as viewed in Fig. 6. With the tool so mounted, the cooperation between the tongue 3 and the sides of the slot 6 is such that the tool is not only centered on the shank, but is also strongly supported against displacement on the shank, as a result of side thrusts when the tool is in use to perform a drilling operation.

In order to hold the tool 4 on the shank 1 and prevent separation of the parts when the tool is withdrawn from the work, the shank 1 provides a transverse opening 7 for receiving a retaining member 8 in the form of a screw or taper pin. The opening 7 passes through the tongue 3, and the diameter of the opening 7 is made somewhat greater than the thickness of the tongue, as shown in Fig. 4. In order to cooperate with the retaining member 8, the sides of the slot 6 in the tool 4 provide oppositely facing notches 9 that register with the opening 7, when the tool is mounted on the shank 1. Therefore, insertion of the retaining member 8, as shown in Fig. 4, will cause those portions thereof extending beyond the opening 7 to be received in the notches 9, thereby effectively preventing withdrawal of the tool 4 from the shank 1.

As previously pointed out, the invention contemplates making the insert tools in various forms from similar blanks cut from flat bar stock, and Figs. 2a and 2b illustrate different forms of such insert tools in perspective. For example, Fig. 2a shows a tool 4a in the form of a countersink wherein the cutting edges 5a have a greater inclination than the cutting edges 5 of the drill which is represented by the tool 4 of Fig. 2. The tool 4b shown in Fig. 2b is in the form of a ball end mill wherein the cutting edge 5b has a curved form. Obviously, either of the tools 4a or 4b can be mounted on the shank 1 with equal facility, with the reception of the shank tongue 3 in the slot 6 of either tool serving to center the tool accurately on the shank 1, while, at the same time, holding it firmly in position against side thrusts resulting from use of the tool for countersinking, or end milling.

Referring now to Figs. 7 to 10, inclusive, there is shown a modified form of tool mounting wherein the shank 1a is provided at one end with a slot 10 that is cut all the way through the round bar stock of which the shank 1a is composed. One side of this slot provides a longitudinal rib 11, shown as being in the form of a round pin, driven into a hole 12 bored into the end of the shank 1a, before the formation of the slot 10, although a square key can be used instead. As shown, about one-half the surface of the pin is exposed to form the rib 11.

An insert tool 13 for mounting on the shank 1a is shown in perspective in Fig. 8 as being made from flat bar stock, with one side of the tool 13 providing a centrally located positioning groove 14. The concave surface of this groove 14 substantially corresponds to the convex surface of the rib 11 provided by the exposed portion of the pin in the hole 12, so that the rib 11 will fit closely in the groove 14 when the tool 13 is inserted in the slot 10 of shank 1a. With the tool 13 so mounted, the cooperation between the rib 11 and groove 14 insures accurate centering of the tool 13 on the shank 1a, while, at the same time, supporting the tool against side thrust when in use.

In order to maintain the tool 13 on the shank 1a and prevent its endwise withdrawal, a cap screw 15 is threaded into an opening 16 extending transversely of the slot 10, with the cap screw passing freely through a hole 17 provided in the tool 13, which hole 17 is in register with the opening 16 when the flat end of the tool engages the base of the slot 10. Two of such screws 15 may be employed in lieu of the rib 11, in order to give the same effect.

As best shown in Figs. 6 and 10, each form of shank 1 or 1a provides chip removing grooves 18 starting on opposite sides of the insert tool 4 or 13 and extending spirally around the outside of the shank. These grooves 18 function very effectively in removing chips when the insert tools are in use, with the grooves having an action similar to the spiral faces of a twist drill of the conventional type.

While the tools previously described with reference to Figs. 2 and 8 are formed from flat bar stock, the tool holding shanks of Figs. 1 and 7 are also adapted to mount insert tools having their cutting edges arranged in circular form, such as the reamer shown in perspective in Fig. 11. This reamer consists of a cylindrical portion 19 having cutting edges 20, and the round bar stock from which the reamer is made is flattened to provide an insert portion 21 having the same cross section as the flat bar stock from which the other tools are made. The flat portion 21 of the reamer provides a slot 22 which is adapted to perform the same function as the slot 6 in the tool 4, when the reamer is mounted on the shank 1.

Figure 12:
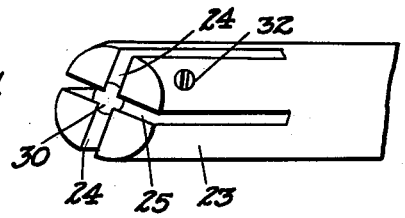

Referring now to Fig. 12, there is shown a modified form of shank 23 provided with a number of angularly displaced slots 24 and 25 for receiving cooperating insert tool portions extending in different planes. Such a tool 26 is shown in Figs. 13 and 14 as providing ribs 27 extending radially from the central axis of the tool, with each rib 27 having a thickness substantially the same as the width of the slots 24 and 25 of the shank 23.

Each rib 27 provides a cutting edge 28 at one end, so that the tool 26 presents a plurality of cutting edges 28 radiating from the tool center to provide a heavy duty drill. The tool 26 is adapted to be readily made from round bar stock by planing operations to leave the ribs 27 projecting radially, after which the cutting edges 28 are formed. The central portion of the tool 26 is bored out at one end to provide an opening 29 of substantially the same length as the central tongue 30 that is left in the shank 23 at the time of cutting the slots 24 and 25, or the ribs 27 can be left solid when the slots are cut clear through the shank 23 to eliminate the tongue 30.

Figure 14:
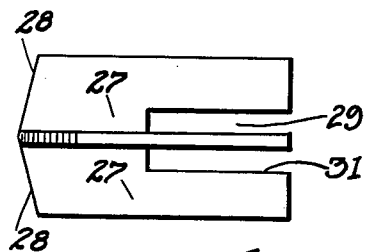
Figs. 14 and 15 are views in side and end elevation, respectively, of the insert tool of Fig. 13.
Figure 15:
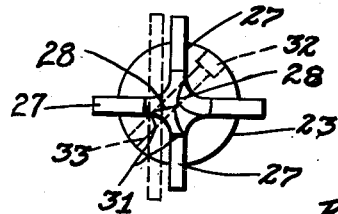

In order that the flat faces of the tongue 30 will fit tightly within the ribs 27, when the tool of Fig. 13 is mounted on the shank 23, the inner portions of the ribs 27 surrounding the opening 29 are flattened, as indicated at 31 in Fig. 15, such flattening being readily accomplished by the passage of a circular grinding disk or cutter between the ribs 27 on four sides of the opening 29, as indicated in dotted lines in Fig. 15. Therefore, when the tool 26 of Fig. 13 is mounted on the shank 23 by entering the ends of the ribs 27 into the slots 24 and 25, the central tongue 30 of the shank will snugly engage the flattened surfaces 31 of the ribs and thereby support the tool in two different planes against side thrusts resulting from cutting operations performed by the tool edges 28.

In order to maintain the tool 26 on the shank 23 and prevent its endwise withdrawal, a cap screw 32 is threaded into an opening 33 extending through the shank between the slots 24 and 25. It is to be noted that where the cap screw 32 passes through the central opening 29 of the tool 26, notches 34 are provided in the flattened surfaces 31 that extend along the inner edges of the ribs 27, which notches 34 embrace a portion of the cap screw 32.

Figure 17:
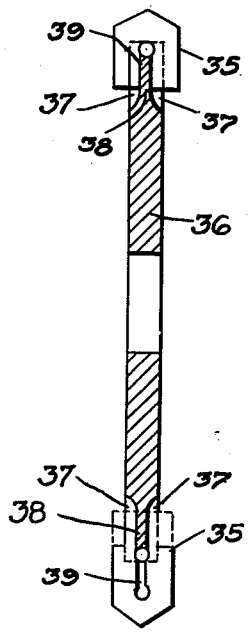
Fig. 17 is a horizontal sectional view along the line 17, 17 of Fig. 16.
Figure 16:
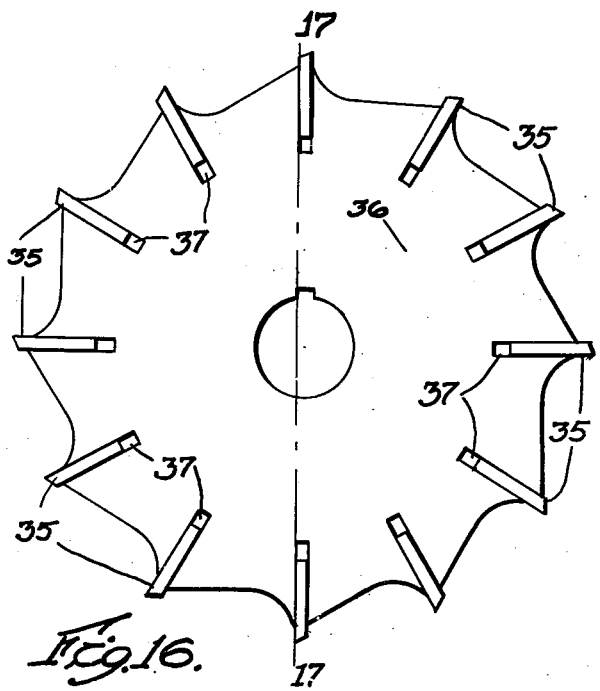
Fig. 16 is a view in front elevation of a modified construction wherein replaceable insert tools are mounted on a tool holder in the form of a circular disk.

Referring to Figs. 16 and 17, there is shown a milling cutter assembly wherein a series of insert tools 35, similar in construction to the tool of Fig. 2, are mounted on a tool holder in the form of a circular disk 36. As best shown in Fig. 17, the disk 36 is provided at a number of points around its periphery with pairs of radial slots 37 formed in substantially the same manner as the slots 2 are formed in the shank 1. Therefore, each pair of slots 37 provide between them a tongue 38 which is adapted to cooperate with the slot 39 of a cutting tool 35, in substantially the same manner as previously described with reference to the mounting of the insert tool 4 on the shank 1. An insert tool 35 is shown as being so mounted at the top in Fig. 17, while a similar insert tool is shown at the right as being partially mounted, in order to illustrate the cooperation between each tool 35 and any selected pair of slots 37 in the edge of the disk 36. It will be apparent from a consideration of Fig. 16 that the holder disk 36 can be provided with any desired number of slots 37 to mount any desired number of insert tools 35, and that the tools 35 can be readily removed and replaced, as desired, without dismounting the disk from its driving spindle.

From the foregoing, it is apparent that by the present invention, there is provided an improved mounting for cutting tools characterized by the fact that the various types of tools are in the form of flat inserts that may be readily mounted on a common tool holding shank. The cooperative relation between each tool and shank is such that the tool is accurately centered on the shank, as by the tongue 3 or the rib 11, with the tool being strongly supported by these elements against side thrusts resulting from cutting operations, so that the tool cannot turn on the retaining members 8 or 15, or otherwise be displaced.

Another important feature contributing to the satisfactory operation of the insert tools is the fact that when a tool is mounted on its shank, a considerable portion of the end of the shank is engaged with the opposite sides of the tool, as indicated in dotted lines of Fig. 4, to provide ample driving surfaces extending substantially the full length of the tool and closely adjacent to the cutting edges thereof. The tool is, therefore, not only strongly supported against side thrusts, but is also closely engaged on opposite sides to provide adequate driving surfaces.

As a result of the above noted characteristics of my improved tool mounting, it is possible to provide complete sets of insert tools at a cost very much less than conventional tool sets, wherein each tool must be of sufficient length to permit its mounting on the head or chuck of a power driven member. By cutting the tool blanks from flat bar stock, the amount of high speed tool steel required for an entire set of tools is reduced to a minimum, and the necessary operations for forming the cutting edges of the tools can be simultaneously performed on a considerable number of identical blanks, thereby further reducing the cost of production.

I claim:

1. A mounting for cutting tools comprising in combination, an elongated shank of uniform diameter provided at one end with slots cut partially through the shank in different planes so as to radiate from a solid tongue located centrally of the shank, and an insert tool in the form of a group of flat ribs integrally united at the center of the tool, with said ribs providing cutting edges lying in different planes at one end of the tool where the ribs are joined together and with the remainder of said ribs being cut away centrally of the tool to provide parallel rib portions for reception in said slots, around said tongue, when the tool is positioned on said shank.

2. A mounting for cutting tools comprising in combination, an elongated shank of bar stock for reception at one end in a power driven device and provided at its other end with a slot extending on opposite sides of an uninterrupted solid integral tongue, of less width than the shank cross-section, said tongue being located centrally of the shank, and extending to a point near the open end of said slot, an insert tool in the form of a flat bar having cutting edges and providing a centrally located slot having a curved seat wider than said slot, at said slot's inner end, for receiving said shank tongue when the tool is inserted endwise in said shank slot to bring said shank tongue in close engagement with the sides of said tool slot, throughout their length, and a retaining member extending transversely through said shank at the outer end of said tongue, flush with the surface of said shank, with said member being larger than the width of said tool slot for reception in said slot seat to positively hold said tool against endwise withdrawal, with the engaged surfaces of said tool slot sides and said tongue serving to rigidly support said tool against side thrust in the immediate vicinity of said retaining member.

WARREN W. WILLIAMS.

REFERENCES CITED

The following references are of record in the file of this patent:

UNITED STATES PATENTS

| Number  | Name       | Date          |
|---------|------------|---------------|
| 186,513 | Adams      | Jan. 23, 1877 |
| 236,105 | Stohlmann  | Dec. 28, 1880 |
| 401,537 | Brown      | Apr. 16, 1889 |
| 748,890 | Taylor et al. | Jan. 5, 1904 |
| 902,387 | Fegley     | Oct. 27, 1908 |

FOREIGN PATENTS

| Number  | Country | Date         |
|---------|---------|--------------|
| 318,641 | Germany | Feb. 7, 1920 |